United States Patent
Jones et al.

(10) Patent No.: US 7,819,417 B2
(45) Date of Patent: Oct. 26, 2010

(54) PROTECTIVE AND DECORATIVE FAUX VEHICLE GRILL COMPONENT

(75) Inventors: Wallace R. Jones, 1855 Oakchime Dr., Orange Park, FL (US) 32065; David A. Higley, Akron, OH (US)

(73) Assignee: Wallace R. Jones, Orange Park, FL (US)

( * ) Notice: Subject to any disclaimer, the term of this patent is extended or adjusted under 35 U.S.C. 154(b) by 257 days.

(21) Appl. No.: 11/891,413

(22) Filed: Aug. 10, 2007

(65) Prior Publication Data

US 2008/0054664 A1 Mar. 6, 2008

Related U.S. Application Data

(60) Provisional application No. 60/837,082, filed on Aug. 11, 2006.

(51) Int. Cl.
*B60D 1/48* (2006.01)
(52) U.S. Cl. ........................... 280/495; 280/500
(58) Field of Classification Search ................ 280/481, 280/495, 500, 501
See application file for complete search history.

(56) References Cited

U.S. PATENT DOCUMENTS

| | | | | |
|---|---|---|---|---|
| 4,326,730 | A * | 4/1982 | Tomen | 280/502 |
| 4,955,968 | A | 9/1990 | Beckerer, Jr. | |
| 5,037,122 | A | 8/1991 | Beckerer, Jr. | |
| 5,421,601 | A | 6/1995 | Hinze et al. | |
| 5,560,631 | A | 10/1996 | Salvo | |
| 5,681,053 | A | 10/1997 | Misukanis et al. | |
| 5,716,066 | A * | 2/1998 | Chou et al. | 280/501 |
| 5,829,775 | A | 11/1998 | Maxwell et al. | |
| 5,873,595 | A * | 2/1999 | Hinte | 280/504 |
| 6,039,339 | A | 3/2000 | Bello | |
| D425,833 | S | 5/2000 | Robinson | |
| 6,322,094 | B1 | 11/2001 | Poe | |
| 6,457,733 | B1 * | 10/2002 | Hansen | 280/481 |
| 6,685,212 | B1 * | 2/2004 | Penlerick et al. | 280/495 |
| 6,698,794 | B2 | 3/2004 | Trampe | |
| 6,742,799 | B1 * | 6/2004 | Hansen | 280/495 |
| 6,832,775 | B1 | 12/2004 | Muller | |
| 6,938,912 | B1 | 9/2005 | Norton et al. | |
| 7,222,873 | B2 * | 5/2007 | Rodgers | 280/495 |
| 2003/0085548 | A1 | 5/2003 | Morgan | |

* cited by examiner

*Primary Examiner*—Kevin Hurley
(74) *Attorney, Agent, or Firm*—Fay Sharpe LLP

(57) ABSTRACT

A faux vehicle grill component includes an elongated body panel having a pair of receivers or connectors at spaced apart locations therealong adapted to lockingly receive a pair of spikes or prongs from a tow bar connecting system protruding outwardly from the grill area of an associated vehicle to be towed. The receivers or connectors are laterally adjustable relative to each other along the body panel as well as laterally of the body panel itself in order to accommodate different or varied spacings of the spikes or prongs. Releasable fasteners are used for selectively securing the associated spikes or prongs to the receivers or connectors. Installation of the faux grill component eliminates a potentially hazardous condition that exists when the spikes or prongs are exposed during a non towed condition of the vehicle.

14 Claims, 4 Drawing Sheets

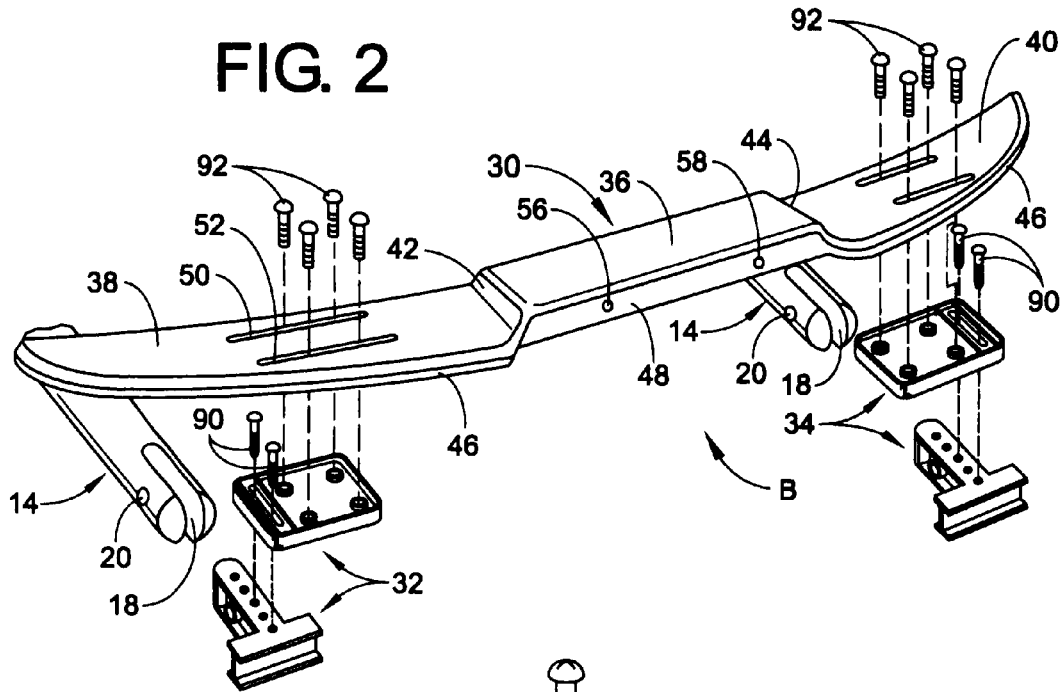
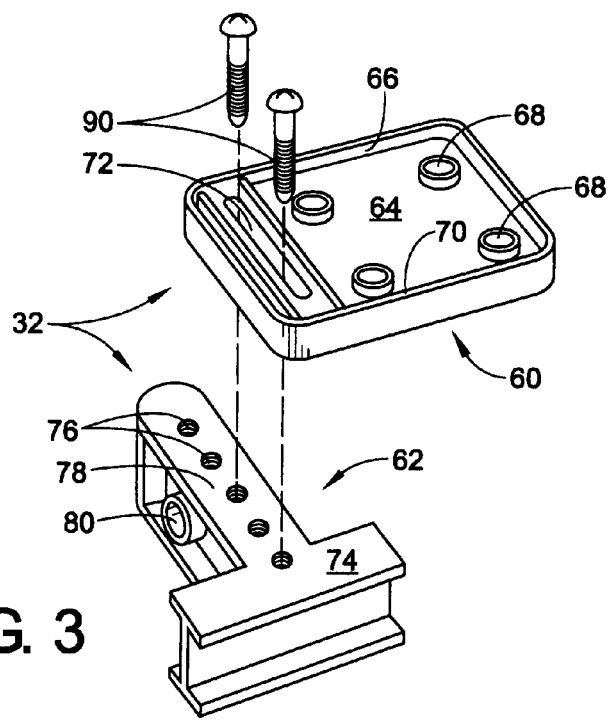

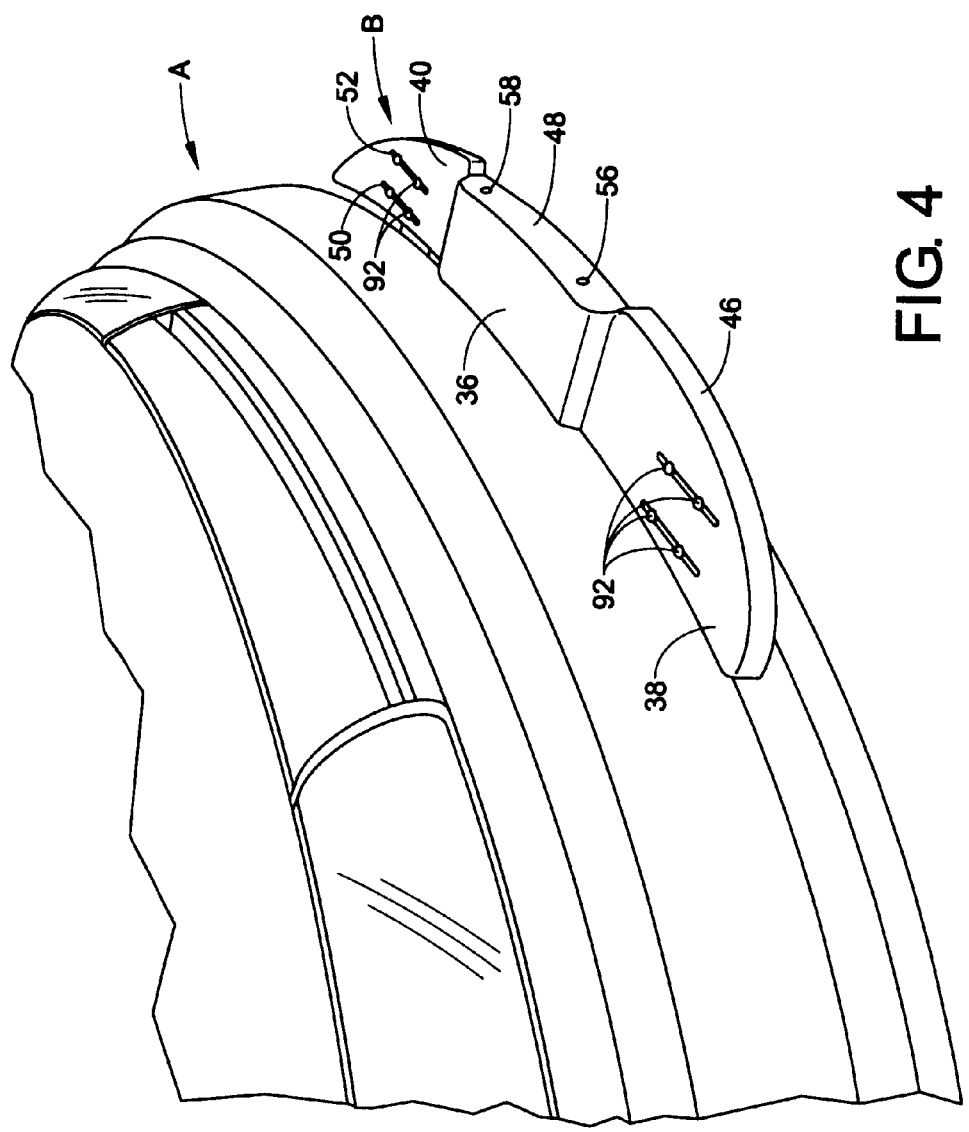

US 7,819,417 B2

PROTECTIVE AND DECORATIVE FAUX VEHICLE GRILL COMPONENT

CROSS-REFERENCE TO RELATED APPLICATION

This application claims priority from and benefit of the filing date of U.S. provisional patent application Ser. No. 60/837,082 filed Aug. 11, 2006 (Aug. 11, 2006), and said provisional application Ser. No. 60/837,082 is hereby expressly incorporated by reference.

BACKGROUND OF THE DEVELOPMENT

This development relates to vehicle tow bar assemblies and, more particularly, to tow bar assemblies or systems that facilitate so-called "four wheels down" towing. The development is particularly suited for towing an automobile type vehicle behind a self contained or bus type camper and will be described with reference thereto. However, the development can also be used for similar applications in related environments.

Self contained camper units or buses are becoming quite popular with families and the like who travel the country for business and/or pleasure. Oftentimes, these units are rather large and cumbersome and difficult to drive or otherwise maneuver in cities or other urban areas. The camper units are typically parked in campgrounds or other designated areas where, once parked, they are difficult or inconvenient to move if the owner for some reason wants or needs drive to an area some distance from the parked unit.

As a result of the foregoing circumstances, many people have commenced to tow regular automobiles behind their camper units in order to have the flexibility of taking side trips or other travel once the camper units have been parked in a camper parking area. While towing vehicles is itself well known, the so-called four wheels down type of towing arrangement is becoming quite popular in this environment. In this type of towing arrangement, a tow bar extends outwardly from the rear of the camper unit and is secured by releasable means to the towed vehicle so that all four wheels of the towed vehicle ride on the road surface during towing.

Tow bar systems for accommodating four wheels down towing are known in the industry and typically require a special tow bar connection to be installed on the vehicle to be towed. The tow bar connection requires some modification to or removal of a portion of the vehicle grill. In existing arrangements, the tow bar connection is such that a pair of spaced apart elongated prongs or spikes extend outwardly from the vehicle grill area generally parallel to and on opposite sides of the vehicle longitudinal axis. These prongs or spikes, in turn, are received by spaced apart receivers disposed on the rear of the tow bar itself. Locking pins are then used to interconnect the tow bar and prongs in order that the vehicle can be safely towed behind the camper unit. When the camper is parked and it is desired to use the towed vehicle, it is simply necessary to remove the locking pins to release the vehicle from its connected condition to the camper unit.

While the foregoing type of towing arrangement is finding success, some problems and issues have been noted. First, it is typically necessary to remove or alter at least a portion of the vehicle grill to facilitate installation of the special tow bar connection. This, in turn, leaves an unsightly appearance to the vehicle when it is driven around by itself. Second, the spikes or prongs extend outwardly from the vehicle grill area and thus create a safety hazard. That is, the spikes or prongs are most generally located at or slightly below knee level and create a potential hazard to persons walking by the front of the vehicle when it is parked. Such potential is particularly acute in the night season when the spikes or prongs are much more difficult to observe to an unwary pedestrian. In an effort to help alleviate this problem, some people have taken to cutting slits in tennis balls, and then inserting such a tennis ball over the outwardly protruding end of each of the spikes or prongs. This, at best, is deemed to be only a temporary fix, and the tennis balls may fall off during driving or otherwise. Moreover, this approach creates an unsightly condition on the vehicle. While it is possible to remove the entire tow bar connection or the spikes or prongs from the vehicle when not in use, such removal is both time consuming and difficult.

Many of the four wheels down installations also include an additional air connection terminal which similarly protrudes outwardly from the grill area of the towed vehicle intermediate the spikes or prongs. This air connection facilitates operation of the brakes of the towed vehicle as is known and presents another unsightly appearance and safety hazard. Still further, installation of the tow bar connection oftentimes necessitates removal of the front license plate mounting bracket. Many states mandate that both front and rear license plates be displayed, so the front license plate must then be displayed in the front window or some other available area at the front of the automobile. This is both cumbersome and unsightly.

The subject new development is deemed to address and overcome the foregoing issues and problems, and provide a new protective and decorative faux vehicle grill component which readily accommodates four wheels down types of vehicle towing systems.

SUMMARY

In accordance with one aspect of the present development, a protective and decorative faux grill component is adapted for selective installation on a tow bar connecting assembly of the type having a pair of outwardly protruding laterally spaced apart connecting prongs. The grill component includes an elongated main panel having opposed end sections extending generally outward from a panel center section. A prong connector is secured to each of the panel end sections. Each prong connector has a prong receiver at a rear area thereof, with axes of the prong receivers being disposed generally parallel to each other and generally transverse to a longitudinal axis of the main panel extending between the opposed end sections. The prong receivers are adapted to retainingly communicate with the connecting prongs of an associated tow bar connecting assembly.

In accordance with another aspect of the present development, a protective and decorative faux grill component is adapted for selective connection to a tow bar connecting assembly having a pair of outwardly protruding connecting prongs. The grill component includes an elongated main panel having a longitudinal axis extending between opposed panel ends disposed outwardly of a panel center section. At least one elongated through slot is defined in each of the panel opposed ends extending parallel to the longitudinal axis. A prong connector is secured to the main panel through the slots at each of the panel ends. A prong receiver is included in each prong connector. The prong receivers have axes disposed generally parallel to each other and generally transverse to the main panel longitudinal axis. First retainers secure the prong connectors to the main panel through the slots and allow selective adjustment of the transverse distance between the prong connectors.

In accordance with another aspect of the present development, an automotive grill component device includes first and second connectors adapted for respective engagement with an associated vehicle tow bar assembly. A body supports and extends between the first and second connectors. The body is adapted to cover at least part of the associated vehicle tow bar assembly with which the first and second connectors are engaged.

BRIEF DESCRIPTION OF THE DRAWINGS

The development may take form in certain parts and arrangements of parts, preferred and alternative embodiments of which will be described in detail in this specification and illustrated in the accompanying drawings which form a part hereof and wherein:

FIG. 2 is an exploded perspective view of a preferred embodiment of the subject development;

FIG. 3 is an enlarged exploded perspective view of a spike or prong connector assembly formed in accordance with the subject development;

FIG. 4 is a perspective view of the development in the installed condition on an automobile;

DETAILED DESCRIPTION OF PREFERRED AND ALTERNATIVE EMBODIMENTS

Figure 1:
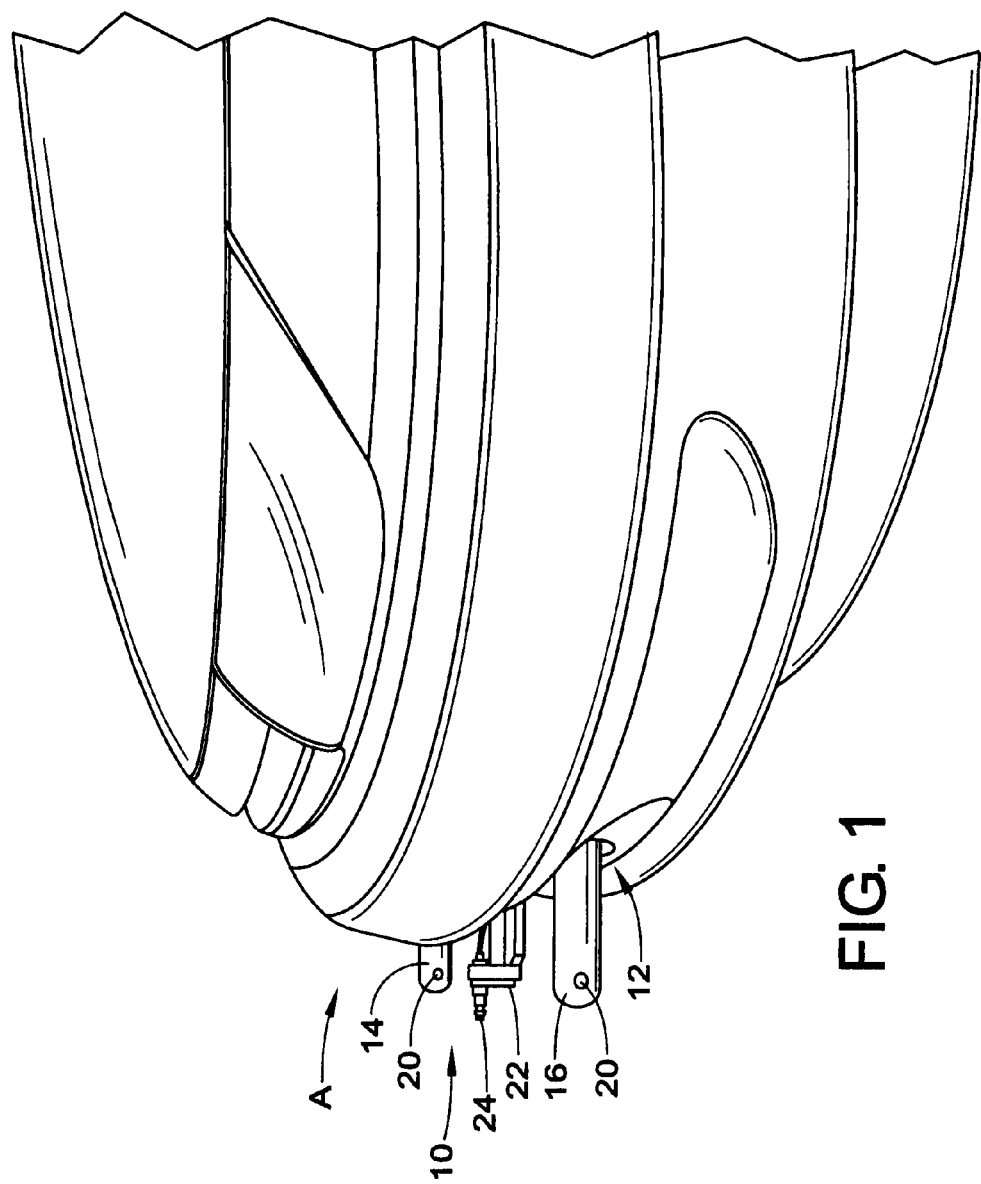
FIG. 1 is a perspective view of an automobile with a four wheels down type of hitch or tow connection secured thereto.

Referring now to the drawings wherein the showings are for purposes of illustrating preferred and alternative embodiments of the development only and not for purposes of limiting same, FIG. 1 shows the forward end of a conventional automobile type vehicle A. A tow bar connecting assembly 10 protrudes outwardly from an opening 12 in the conventional grill area of the automobile. Normally, the grill area must be modified at least slightly to create opening 12 as is known in order to accommodate tow bar connecting assembly 10. The construction of the connecting assembly itself is generally known and includes a pair of spaced apart spikes or prongs 14, 16 fixedly secured to the automobile so as to protrude outwardly from the grill area generally parallel to and transversely spaced apart on opposite sides of the automobile centerline.

The spikes or prongs are most often removably secured to tow bar connecting assembly 10 in a known manner (not shown) wholly sufficient to allow towing of the automobile. The spikes or prongs 14, 16 are constructed from a strong metal such as steel or metal alloy and have a generally cylindrical conformation with a somewhat blunt or rounded outer end as is shown in FIG. 1. A slot 18 (FIG. 2) extends axially inward from the blunt outer end of each of prongs 14, 16 to facilitate installation of the subject faux grill to an associated vehicle. A locking pin receiving opening 20 is included in each spike or prong adjacent the outer end thereof. Conventional locking pins are removably receivable through these openings for attaching a tow bar (not shown) to the tow bar connecting assembly.

In addition, an air cylinder assembly 22 is sometimes also mounted to the tow bar connecting assembly in such manner that it similarly protrudes outwardly from automobile grill opening 12. This cylinder includes a fitting or coupling 24 to accept an air supply hose running from the camper unit itself in order to facilitate operation of the automobile brakes during towing.

Because spikes or prongs 14, 16 protrude outwardly from the grill area at approximately knee height or so, they present a hazardous situation when the automobile is not connected to the tow vehicle and is being driven around in public areas. When cylinder assembly 22 is used, it, too, presents a potentially hazardous condition. Moreover, since it is typically necessary to remove a portion of the automobile grill in order to successfully mount the tow bar connecting assembly to the automobile, removal of the front license plate bracket is most often required. This presents some issues in those states which require display of both front and rear license plates on vehicles registered in those states.

In an effort to reduce the hazardous potential presented by the outwardly protruding spikes or prongs, as well as the cylinder in those installations where it is used, some people have taken to slitting tennis balls and then slipping them over the outermost ends of the protruding components. This presents an unsightly appearance, and simple driving of automobile A may dislodge the balls from their protective positions, thus re-exposing the hazardous elements of the spikes and cylinder.

As best shown in FIGS. 2 through 4, the subject new development advantageously provides a protective and decorative faux vehicle grill component or unit generally designated B. This device is comprised of an elongated generally flat panel or body 30 and a pair of spaced apart prong receiver or connector assemblies 32, 34. The panel or body 30 has a central area 36 with opposed ends or wings 38, 40 extending oppositely outward therefrom at wall areas 42, 44, respectively. Each of opposed ends or wings 38, 40 includes a downwardly depending or extending flange area 46 extending along at least the front edge thereof. In like manner, central area 36 includes a slightly recessed flange area 48 depending therefrom. It is to be noted that the front edges of ends or wings 38, 40 have a generally arcuate or otherwise convexly curved conformation from their connections with central portion 36 to their outermost ends. This conformation is highly desirable for reasons to be described hereinbelow.

A pair of elongated slots 50, 52 extend through the surface of each of ends or wings 38, 40 for mounting and adjustment purposes as will be described. These slots are located so that when the device is installed on an automobile, the slots are disposed to run transversely of the automobile longitudinal axis and the spikes or prongs protruding from the vehicle grill area. In addition, fastener openings 56, 58 penetrate flange area 48 and are appropriately spaced apart from each other to facilitate securing a license plate and/or a license plate holder frame thereto.

The protective and decorative faux vehicle grill component or unit B is preferably molded from a suitable plastic material or resin which has some flexibility and is capable of absorbing some shocks or loading as may be encountered in a vehicle driving type of environment. Depending upon the specific application of unit B, different types of plastics or resins may be preferred. Flange areas 46, 48 and walls 42, 44 provide structural strength to unit B but will allow for some bending or flexing to accommodate some loading during use.

Continuing with reference to FIGS. 2 and 3, prong receivers or connectors 32 and 34 are virtually identical. Accordingly, description will hereafter be made to prong receiver 32, it being appreciated that receiver 34 is identical thereto.

FIG. 3 in particular shows receiver 32 as comprised of a generally square or rectangular intermediate plate or plane 60 and a lower or vertical slot or crevice adaptor 62.

Plate or plane 60 has a generally flat base or body 64 with a peripheral flange 66 protruding at least upwardly therefrom. A plurality of screw receiving protrusions or pedestals 68 extend at least upwardly from base or body 64, and each includes a threaded fastener receiving opening 70 extending thereinto for reasons and purposes to be described. Four such openings are used in the preferred embodiment and they are positioned to align with slots 50, 52 in wings 38, 40 of body 30 for reasons that will become apparent hereinafter. An elongated through slot 72 is disposed adjacent one side edge of the intermediate plate 60 from adjacent the front face toward the rear face thereof. The purpose of slot 72 will likewise be described hereinbelow.

Lower or vertical slot or crevice adaptor 62 has a generally T-shaped overall conformation with a cross section which is similar to an I-beam. However, many other conformations may also be satisfactorily employed within the spirit and scope of the subject development. A planer upper surface 74 of this adaptor includes a plurality of threaded fastener receiving openings 76 extending thereinto along leg 78 which defines a tang or extension/projection for mounting purposes in a manner to be described. A reinforced pin receiving opening 80 extends through leg 78 transversely of openings 76 for likewise mounting the faux grill B to an associated vehicle A in a manner to be described.

Intermediate plate or plane 60 and lower or vertical slot or crevice adaptor 62 are preferably constructed or molded from a plastic material which has suitable strength and rigidity to retain the faux grill in a securely mounted position on an associated vehicle while allowing flexibility to absorb some impact. The specific type of material employed will be dictated to some extent by the particular application intended for the faux grill.

Referring now to all of FIGS. 1-4, description will be made to installation and use of the subject protective and decorative faux vehicle grill component or unit B. Component B is adapted to conceal the outwardly protruding portions of tow bar connecting assembly 10 (FIG. 1) including the spikes or prongs 12, 14 as well as air cylinder 22 while providing a more aesthetically pleasing appearance to the automobile.

To that end, for each of connectors or receivers 32, 34, first retainers or threaded fasteners 90 are employed to first loosely connect plate or plane 60 to slot or crevice adaptor 62 via slot 72 and selected ones of openings 76 (FIG. 3). These components are then loosely secured to ends or wings 38, 40 of flat panel or body 30 by second retainers or threaded fasteners 92. These fasteners pass through slots or openings 50, 52 of body 30 and into openings 70 in base or body 64 of crevice adaptor 62. Components 60, 62 may then be manipulated in slots 50, 52 and 72, respectively, to secure the proper and desired alignment of the faux grill component or unit B with prongs 14, 16 of connecting assembly 10 on an associated automotive vehicle A. Once the desired alignment is achieved, fasteners 90, 92 may be tightened to secure the components in their desired fixed positions. While threaded fasteners 90, 92 are preferred, it is to be appreciated that other types of retaining or securing devices or systems may also be used to advantage within the spirit and scope of the development.

When properly aligned, legs 78 of prong receivers or connectors 32 and 34 are received in slots 18 of spikes or prongs 14, 16, respectively, so that through openings 80 align with openings 20 in the prongs. Unit B is then retained in position by means of conventional locking pins or the like (not shown) which are inserted through these aligned openings 80, 20. In fact, the locking pins may comprise the very same pins used for connecting tow bar connecting assembly 10 to the tow bar itself and, thus, are known. In addition, a strip of adhesive foam or gasket material (not shown) may advantageously be applied to a flange area depending from central area 36 of panel or body 30 opposite from flange area 48. This foam or gasket material will cushion the assembly and prevent noise or rattling between the vehicle and unit B under normal driving conditions.

The design and arrangement of the preferred embodiment here under discussion allows for selective adjustment of the transverse distance between legs 78 in connectors or receivers 32, 34 along slots 50, 52 (FIG. 2) of from a minimum of approximately 16.25 inches to a maximum of approximately 31.5 inches. Similarly, slots 72 in intermediate plates or planes 60 in combination with threaded openings 76 in legs 78 of slot or crevice adaptors 62 allow for a forward and aft adjustment of approximately 3.25 inches. Thus, the faux grill unit of the subject embodiment is readily adapted to effective use in a wide variety of different applications to accommodate a wide variety of different types of vehicles.

When fully installed, the arcuate or otherwise convexly curved shape of end areas or wings 38, 40 prevent injury to anyone who may accidentally bump into the grill area of the vehicle. Flange 46 helps conceal the prong connectors or receivers 32, 34 from view while enhancing the overall aesthetic appearance. Raised central area 36 of panel or body 30 covers and conceals cylinder 22 and air supply fitting 24. Spaced openings 56, 58 in wall or flange 48 provide means for attaching a front license or other plate (not shown) against wall 48. When it is desired to tow automobile A, it is simply necessary to remove unit B from its mounted relationship as shown in FIG. 4 to expose tow bar connecting assembly 10 as shown in FIG. 1 for connection in a known manner to the tow bar connecting assembly on an associated camper vehicle. Unit B can then be conveniently stored until it is again required for use.

Figure 5:
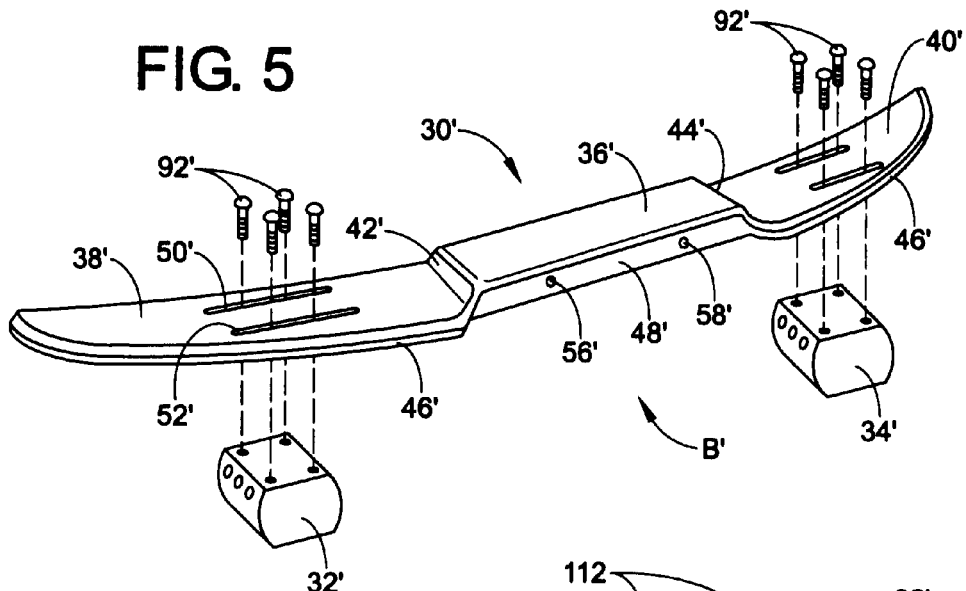
FIG. 5 is a perspective view similar to FIG. 2 showing an alternative embodiment of the subject development.
Figure 6:
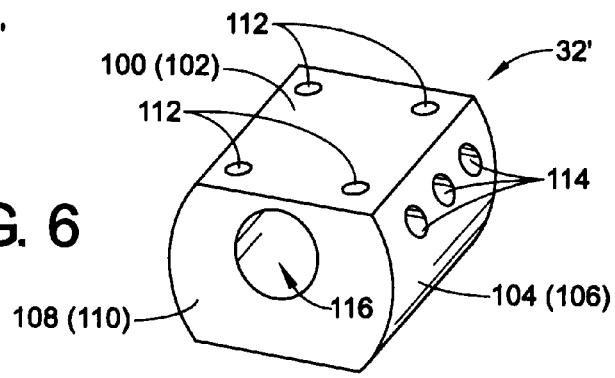
FIG. 6 is an enlarged perspective view similar to FIG. 3 for showing the prong connector assembly formed in accordance with this alternative embodiment; and, FIG. 7 is a front elevational view of another alternative embodiment of the development.

FIGS. 5 and 6 show a modified version of the subject protective and decorative faux vehicle grill component. For ease of appreciating and understanding this alternative, like components are identified by like numerals with a primed (') suffix and new components are identified with new numerals. FIG. 5 in particular shows receiver 32' as having opposed top and bottom faces 100, 102, opposed side faces 104, 106, and opposed rear and front faces 108, 110. While side faces 104, 106 are shown as being somewhat outwardly convex, it will be appreciated that other conformations for all the various faces may be varied as necessary and/or desirable for manufacturing or product utility purposes. Receivers 32', 34' may also be molded from a plastic material or resin material as necessary and desired to achieve the necessary strength and flexibility. In some cases, it may be desirable to have the internal portion of the receivers constructed from an impact absorbent material. Such design and manufacturing modifications will be mandated by the specific application intended for the faux vehicle grill component B'.

A series of openings 112 penetrate receiver 32' from top surface 100 and are used to adjustably secure the receiver to flat panel or body 30' at end area or wing 38' by means of conventional threaded fasteners or the like 92'. A series of locking pin receiving openings 114 extend through the receiver between side walls 104, 106. These openings are used to fixedly secure unit B' to an associated tow bar connecting assembly in a manner to be described. A larger opening or bore 116 extends inwardly into receiver 32' from rear face 108 toward front face 110. While this opening is shown as being generally circular in cross section, it is dimensioned and configured to conform generally to and receive an associated spike or prong 14, 16 when the unit B' is installed on an automobile. Openings 114 communicate transversely through opening or bore 116 in order to adjustably receive a locking pin therethrough when unit B' is installed.

Referring to both of FIGS. 5 and 6, component B' is again adapted to fit over and conceal the outwardly protruding portions of a tow bar connecting assembly in the same manner as previously described. To that end, retainers or threaded fasteners 92' are employed to connect prong receivers 32', 34' to ends or wings 38', 40', respectively, of generally flat body 30'. These fasteners pass through slots or openings 50', 52' of body 30' and into openings 112 in top walls 100 of the prong receivers (FIG. 6) to thereby assemble these components together into a single unit. The prong receivers may be moved laterally toward and away from each to accommodate the lateral spacing between the spikes or prongs 14, 16 of the tow bar assembly.

Once the prong receivers are appropriately spaced and securely fastened to flat panel or body 30' by tightening fasteners 92', unit B' is ready for installation on an associated automobile. This is accomplished simply by sliding the unit onto the outwardly protruding prongs (14, 16 in FIG. 1) in the same advantageous manner previously described. Unit B' is retained in position by conventional locking pins or the like (not shown) which are inserted through an appropriate one of openings 114 in the side walls of prong receivers 32', 34'. These fasteners also pass through pin receiving openings (20 in FIG. 1). The plurality of openings 114 thus accommodate some forward and aft adjustment of unit B' relative to an associated tow bar connecting assembly.

Figure 7:
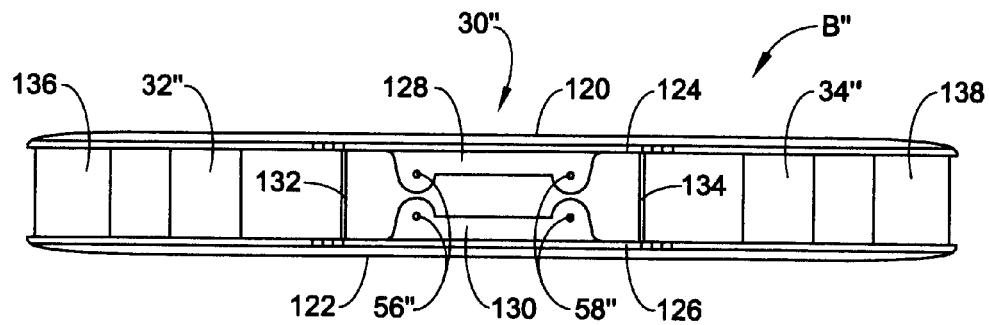

FIG. 7 shows another modified version of the subject protective and decorative faux vehicle grill component. There, for ease of appreciating and understanding this alternative, like components are identified by like numerals with a double primed (") suffix and new components are identified with new numerals. Unit B" is comprised of first upper and second lower panels 120, 122 which have peripheral conformations similar to the arrangement of the preferred embodiment as shown in FIG. 2. These panels have downwardly and upwardly disposed flanges 124, 126, respectively, along the peripheral edges thereof as shown in the drawing. Flange extensions 128, 130 extend from flanges 124, 126, respectively, and include holes or openings 56", 58" to accommodate affixation of a license plate and/or a frame for retaining a license plate.

Spacing and stabilizing fins 132, 134 are affixed to and extend laterally between panels 120, 122. Curved/arcuate spacing and stabilizing fins 136, 138 extend between the panels adjacent the outboard ends thereof, and prong receivers 32", 34" are likewise interposed between panels 120, 122 intermediate fins 132, 136 and 134, 138, respectively. As with the preferred embodiment, the receivers are adjustable laterally of each other along upper and lower panels 120, 122. This alternative arrangement provides a strong reinforced construction and functions in the same manner as described above relative to the preferred embodiment. The various components of unit B" can be molded from a plastic or other suitable resinous material and then fabricated into a single unit by conventional means which themselves do not form a part of the present development.

The development has been described with reference to the preferred and alternative embodiments. Modifications and alterations will occur to others upon a reading and understanding of this specification. It is intended to include all such modifications and alterations insofar as they come within the scope of the appended claims or the equivalents thereof.

Having thus described the development, it is now claimed:

1. A protective device for a tow bar connecting assembly, said device comprising:

first and second connectors adapted for respective engagement with an associated vehicle tow bar connecting assembly;

a body connected to and extending between the first and second connectors, said body adapted to cover at least part of the associated vehicle tow bar connecting assembly with which the first and second connectors are engaged, wherein said body comprises elongated through slots for securing said first and second connectors to said body, said slots permitting a distance between said first and second connectors to be selectively adjusted; and first retainers communicating between said body and said first connector and between said body and said second connector, said first retainers passing through said elongated slots for securing said first and second connectors to said body.

2. A protective device for a tow bar connecting assembly, said device comprising:

first and second connectors adapted for respective engagement with an associated vehicle tow bar connecting assembly;

a body connected to and extending between the first and second connectors, said body adapted to cover at least part of the associated vehicle tow bar connecting assembly with which the first and second connectors are engaged, wherein said body comprises elongated through slots for securing said first and second connectors to said body, said slots permitting a distance between said first and second connectors to be selectively adjusted; wherein said elongated through slots comprise:

a first pair of said elongated through slots by which said first connector is secured to said body; and, a second pair of said elongated through slots by which said second connector is secured to said body.

3. A protective device for a tow bar connecting assembly, said device comprising:

first and second connectors adapted for respective engagement with an associated vehicle tow bar connecting assembly;

a body connected to and extending between the first and second connectors, said body adapted to cover at least part of the associated vehicle tow bar connecting assembly with which the first and second connectors are engaged;

wherein a distance between said first and second connectors is adjustable by selective movement of said first and second connectors on said body.

4. The device as defined in claim 3, further comprising first releasable retainers for securing said first and second connectors to said body while allowing selective adjustment of said distance between said first and second connectors along a longitudinal axis of said body.

5. The device as defined in claim 4 further comprising second releasable retainers for allowing selective adjustment of said first and second connectors laterally relative to said longitudinal axis of said body.

6. The device as defined in claim 3, wherein said body comprises elongated through slots for securing said first and second connectors to said body, said slots permitting said distance between said first and second connectors to be selectively adjusted.

7. The device as defined in claim 3 wherein each of said first and second connectors is comprised of a base portion and an adaptor, said base portion being secured to said body by first retainers and said adaptor including a portion adapted to engage a respective prong of the associated vehicle tow bar connecting assembly.

8. The device as defined in claim 7 wherein said adaptors are selectively releasably secured to their respective associated base portions by second retainers for accommodating selective shifting of said adaptors relative to their respective associated base portions in a direction transverse to a longitudinal axis of said body.

9. The device as defined in claim 3 wherein each of said first and second connectors includes a connector pin receiving opening defined therein and adapted for receiving an associated connecting pin therethrough.

10. The device as defined in claim 9 wherein each first and second connector comprises a bore, and wherein said connector pin receiving opening extends laterally through said bore.

11. The device as defined in claim 3, wherein said body includes a forward edge with a flange area depending therefrom.

12. The device as defined in claim 11 wherein said flange area comprises spaced openings for mounting an associated license plate to the body.

13. The protective device as set forth in claim 3, wherein said first and second connectors are adapted to be engaged with respective first and second prongs of the associated vehicle tow bar connecting assembly.

14. The protective device as set forth in claim 13, wherein the first and second connectors each comprise at least one opening adapted to receive an associated locking pin for releasable securement of the first and second connectors to the associated first and second prongs, respectively.

* * * * *